Aug. 11, 1931.  A. KAZENMAIER ET AL  1,818,334
BRAKE MECHANISM
Filed June 3, 1929  2 Sheets-Sheet 1

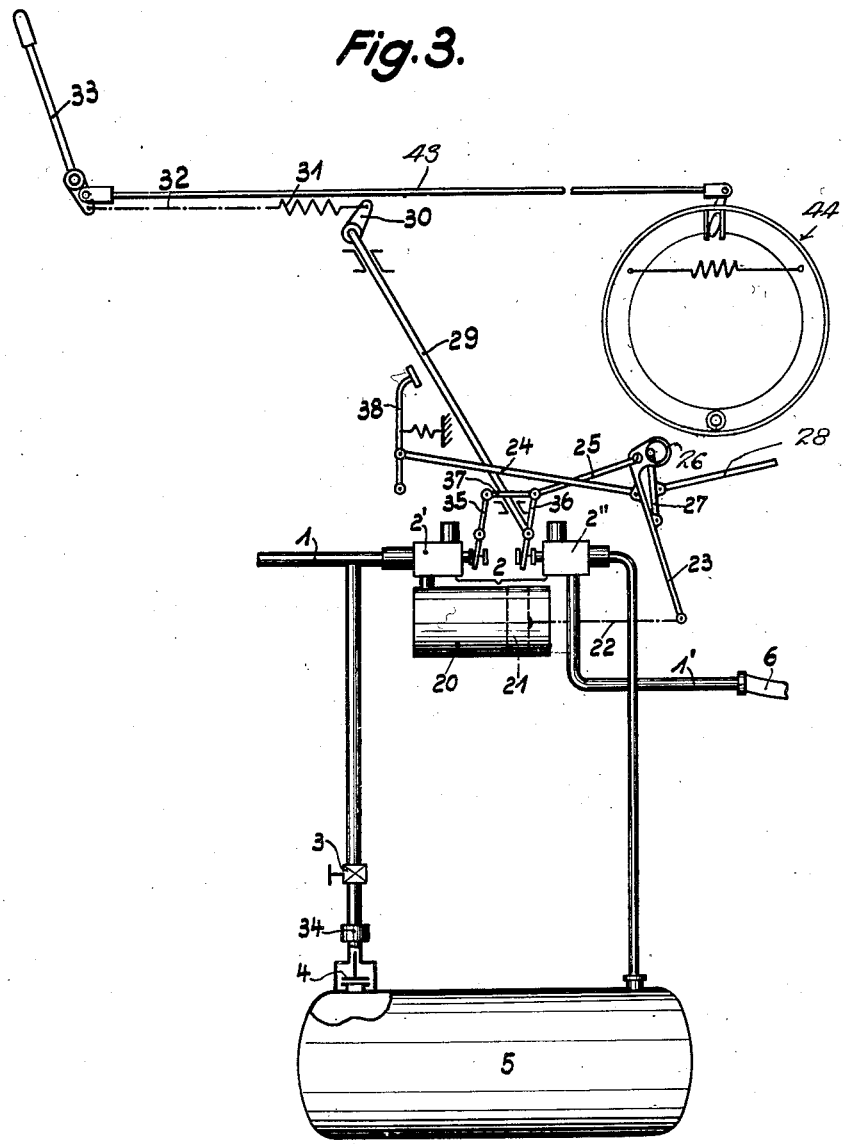

Patented Aug. 11, 1931

1,818,334

UNITED STATES PATENT OFFICE

AUGUST KAZENMAIER AND ALFONS STRAUSS, OF STUTTGART, GERMANY, ASSIGNORS TO ROBERT BOSCH AKTIENGESELLSCHAFT, OF STUTTGART, GERMANY

BRAKE MECHANISM

Application filed June 3, 1929, Serial No. 368,108, and in Germany September 3, 1928.

The present invention relates to brake mechanism for vehicles and more particularly to brake mechanism for trailer vehicles of the type described in the copending patent application of Kazenmaier, Serial No. 368,104, filed June 3, 1929, in which servo brakes can be released either automatically by pressure or vacuum produced by pumping means such as the engine of a tractor vehicle or manually by means of mechanism mounted on the vehicle, the energy for the succeeding application of the brakes being simultaneously stored up and in which the manually operated mechanism can be locked in the "off" position of the brakes, and can be subsequently automatically released when the pressure or vacuum applied to the brakes is sufficient to keep the brakes off.

According to the prepared form of construction shown in the said co-pending patent application this is achieved by allowing the piston of a cylinder specially provided for release of said manually operated mechanism and connected with the vehicle brake pipe, to act on the locking means of said manually operated mechanism.

According to this invention the manually operated mechanism is constructed so that a special compression or vacuum cylinder is not necessary for releasing the brakes, the pressure or vacuum set up in the braking cylinder itself for releasing the brakes and the stroke of the brake piston caused thereby being used for this purpose.

This invention also relates to the common control for motor vehicle and trailer brakes described in the said co-pending patent application in which a brake applicable by vacuum or pressure is used in a motor vehicle and a brake releasable by vacuum or pressure in a trailer.

Accordingly a further feature of the present invention lies in the provision of an adjustable lever of a second or auxiliary tractor brake independent of the tractor servo brake which is coupled with the control mechanism for the common servo brake valve of the tractor and trailer brakes so that the lever actuates the trailer brakes in addition to the second motor vehicle brakes but cannot itself be affected by the main servo brakes.

Further, by this invention a throttling element e. g. a jet is provided in front of an air chamber in the pipe leading from the compresser or evacuator on a motor vehicle to the brake valve, which on breakage of or damage to the pipe leading to the trailer, delays undesired introduction of atmospheric air into the compression or vacuum pipe for the motor vehicle brakes.

One form of construction according to the invention is shown in the accompanying drawings in which:—

Figure 3 shows the brake control system.

Figure 1:
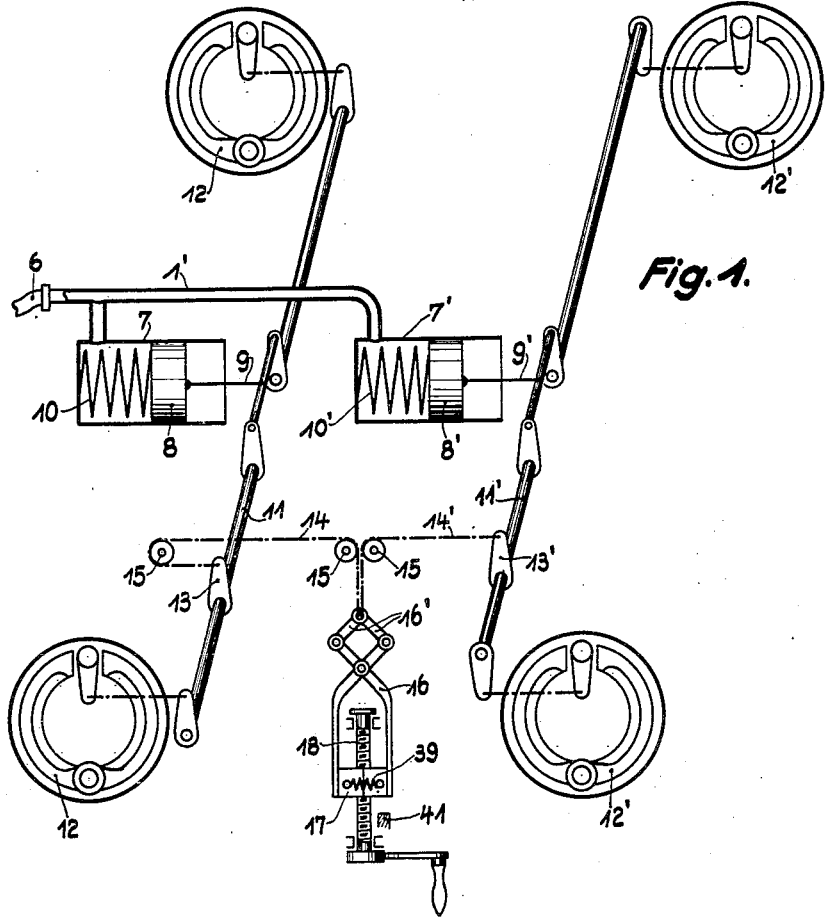
Figure 1 shows the four wheel brakes of a trailer vehicle and the locking mechanism.

The individual elements of the present example of construction which appear in the principal application have the same reference letters as therein.

A branch of a suction pipe 1 leading from the engine of a tractor vehicle is taken to each of elements 2' and 2" of a brake valve 2, having a common control for the motor vehicle and trailer brakes. The motor vehicle brakes are suction brakes of known construction. A pipe leads from the valve 2" to two parallel brake cylinders 7 and 7' for the front and rear wheel brakes of the trailer. The cylinders enclose springs 10 and 10'. Pistons 8 and 8' are articulated by rods 9 and 9' to brake shafts 11 and 11' from which braking power is transmitted in known manner to brakes 12 and 12'.

Figure 2:
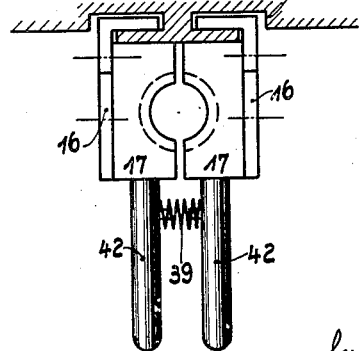
Figure 2 shows details of the mechanical brake releasing mechanism, whilst

Each of the shafts 11 and 11' has a lever 13 and 13' from the ends of which cables 14 and 14' pass over rollers 15 to a pair of pivoted levers 16 of a lazy tongs device. The cables 14 and 14' are preferably not secured directly to the short arms of the levers, but to the centre point of articulation of a pair of links 16' articulated at their other ends to these lever arms. One half of a split nut 17, the thread of which coincides with that of a spindle 18, is mounted on the free end of each arm of the levers. The thread is self-locked and the nut halves are prevented from rotating (see Figure 2). A spring 39 tends to move the two halves of the nut out of engagement and into contact with a guide member 40 extending axially of the spindle. A handle 42 is secured to each half of the nut. The nut can be closed by counter-pressure on these handles. The movement of the nut is limited by a stop 41. The spindle 18 is rotatable but is secured to an easily accessible point on the frame of the vehicle so as not to be displaceable longitudinally of itself.

When the trailer is uncoupled from or has broken away from the motor vehicle and is therefore braked by removal of the vacuum, the individual members of the brake have the following positions:—

The compression springs 10 have forced the piston 8 to the right. The brake shoes have been applied by the rods 9 and 11. The two halves of the nut 17 have been raised from the spindle 18 by the compression spring 39 and have been drawn by the cables and the levers 16 into an inner end position varying with the shape of the rods and the wear of the brake shoes.

If it is desired to release the brakes of the uncoupled trailer, the operator must grasp the two handles 42 of the nut 17 and force them toward each other until the thread of the nut engages the thread of the spindle 18. Then the operator turns the hand crank of the spindle, moving thereby the nut 17 outwardly. The nut 17 draws the lever 16 and the cables 14 with it. These then rotate the shafts 11 so that the pistons 8 are forced into the cylinders 7 thereby compressing the spring 10. After a predetermined movement, the nut 17 strikes against a stop 41, which limits the manual release of the brakes. The tension of the spring 39 is selected so that when the nut is closed it is less than the force holding the unit halves in position under the tension exerted through the long arms of 16 by the cables 14.

If the trailer is now coupled with the motor vehicle, the vacuum set up by the engine reaches the brake cylinder 7 and draws the piston 8 still further into the cylinder than has already been done by the manual release of the brakes. The rods 9 and the levers connected thereto consequently rotate the shafts 11 so that the cables 14 are slightly slackened. As the levers 16 are now relieved the spring 39 can lift the halves of the nut from the spindle. After this automatic release, the trailer brakes can be actuated from the motor vehicle as desired as long as the pipe connection is undamaged. The end position for the manual brake release must be selected so that the vacuum at normal value causes a movement of the brake piston 8 beyond this position.

The brake cylinders in the motor vehicle and trailer are controlled in common by the double valve 2. A rod 24, which is connected with the brake piston 21 and a valve control lever 35, 36, 37 by means of a rocking lever 23 and members 22 and 25, is articulated to the foot brake lever 38. One end of a lever 27 is also articulated to the rocking lever 23 whilst the other end is freely movable in an eye 26 of the rocking lever 23. The motor vehicle brake rod 28 engages the lever 27. The double valve 2 is thus controlled in known manner by the relative movement of the brake lever and brake rods.

The control lever 36 is rigidly mounted on the axle 29 which is connected with the hand brake lever 33 by means of a lever 30, a spring 31 and a cable 32. The hand lever is adjustable in a manner not shown and is connected by a rod 43 with a second or auxiliary tractor brake, indicated generally by 44, independent of the servo brakes. The spring 31 allows the lever 36 to move relative to the hand lever 33 when using the foot brake.

This mechanism operates as follows:—

If a load consisting of a motor vehicle and trailer or plurality of trailers is to be stopped or held stationary on an incline, a hand brake of the usual strength may not be sufficient for this purpose, since it acts only on the motor vehicle. If on the other hand the hand brake lever 33 in the present construction is applied, the second motor vehicle brake connected therewith comes into operation and in addition the brake valve 2 for the motor vehicle and trailer is set at braking. A vacuum is thereby set up in the brake cylinder 20 of the motor vehicle, which directly applies the brakes, whilst air enters the brake cylinder 7 of the trailer and releases the brake springs 10. As the hand brake lever is secured in position, the control is maintained and the trailer brakes remain applied until a sufficient vacuum is again set up in the brake cylinder to overcome the springs 10.

A jet 34 having a throttling action is inserted in the branch of the pipe 1 leading to the cut-off valve 3 and the air vessel 5 between the cut-off valve 3 and a non-return valve 4, which prevents too much air at atmospheric pressure entering the brake pipe of the motor vehicle brakes on uncoupling the trailer, and adversely affecting the braking action.

We claim:

1. Brake mechanism for vehicles comprising brakes on a vehicle, at least one servo cylinder on said vehicle, a servo piston within said cylinder and connected to said brakes, pumping means adapted to be connected to said cylinder to move the piston in the brake releasing direction, means for storing up energy on movement of the piston in the brake releasing direction and for giving up said energy on disconnection of the pumping means from the cylinder to force the piston in the opposite direction to apply the brakes, and manual means which are detachably connected to said piston for moving the piston against the resistance of said storing means into a brake release position, and which are adapted to be automatically disconnected from the piston on further movement of the piston in the brake releasing direction under the influence of said pumping means.

2. Brake mechanism for vehicles comprising brakes on a vehicle, at least one servo cylinder on said vehicle, a servo piston within said cylinder and connected to said brakes, pumping means adapted to be connected to said cylinder to move the piston in the brake releasing direction, means for storing up energy on movement of the piston in the brake releasing direction and for giving up said energy on disconnection of the pumping means from the cylinder to force the piston in the opposite direction to apply the brakes, manual means for moving the piston against the resistance of said storing means into the brake releasing direction, and means for locking said manual means in a brake release position, said manual means being adapted to be automatically released on further movement of the piston in the brake releasing direction under the influence of said pumping means.

3. Brake mechanism for vehicles comprising brakes on a vehicle, at least one servo cylinder on said vehicle, a servo piston within said cylinder and connected to said brakes, pumping means adapted to be connected to said cylinder to move the piston in the brake releasing direction, means for storing up energy on movement of the piston in the brake releasing direction and for giving up said energy on disconnection of the pumping means from the cylinder to force the piston in the opposite direction to apply the brakes, manual means which are detachably connected to said piston for moving the piston against the resistance of said storing means into a brake release position and which are adapted to be automatically disconnected from the piston on further movement of the piston in the brake releasing direction under the influence of said pumping means, and a stop for limiting the movement of said piston by the manual means.

4. Brake mechanism for vehicles comprising brakes on a vehicle, at least one servo cylinder on said vehicle, a servo piston within said cylinder and connected to said brakes, pumping means adapted to be connected to said cylinder to move the piston in the brake releasing direction, means for storing up energy on movement of the piston in the brake releasing direction and for giving up said energy on disconnection of the pumping means from the cylinder to force the piston in the opposite direction to apply the brakes, manual means which are detachably connected to said piston for moving the piston against the resistance of said storing means into a brake release position and which are adapted to be automatically disconnected from the piston on further movement of the piston in the brake releasing direction under the influence of said pumping means, and a stop for limiting the movement of said piston by the manual means.

5. Brake mechanism for vehicles comprising brakes on a vehicle, at least one servo cylinder on said vehicle, a servo piston within said cylinder and connected to said brakes, pumping means adapted to be connected to said cylinder to move the piston in the brake releasing direction, means for storing up energy on movement of the piston in the brake releasing direction and for giving up said energy on disconnection of the pumping means from the cylinder to force the piston in the opposite direction to apply the brakes, a lazytongs device, a cable connection between one end of said lazytongs device and said piston, a pair of half nuts secured to arms at the other end of said lazytongs device, a rotatable threaded spindle adapted to be engaged by said nuts and to displace said lazytongs in the direction for causing release of the brakes, and resilient means tending to force said half nuts apart and away from said threaded spindle.

6. Brake mechanism for vehicles comprising brakes on a vehicle, at least one servo cylinder on said vehicle, a servo piston within said cylinder and connected to said brakes, pumping means adapted to be connected to said cylinder to move the piston in the brake releasing direction, means for storing up energy on movement of the piston in the brake releasing direction and for giving up said energy on disconnection of the pumping means from the cylinder to force the piston in the opposite direction to apply the brakes, a lazytongs device, a cable connection between one end of said lazytongs device and said piston, a pair of half nuts secured to arms at the other end of said lazytongs device, a rotatable threaded spindle adapted to be engaged by said nuts and to displace said lazytongs in the direction for causing release of the brakes and a compression spring lying with its axis perpendicular to the interengaging faces of said half nuts and tending to force said half nuts apart and away from said threaded spindle.

7. Brake mechanism for vehicles comprising brakes on a vehicle, at least one servo cylinder on said vehicle, a servo piston within said cylinder and connected to said brakes, pumping means adapted to be connected to said cylinder to move the piston in the brake releasing direction, means for storing up energy on movement of the piston in the brake releasing direction and for giving up said energy on disconnection of the pumping means from the cylinder to force the piston in the opposite direction to apply the brakes, a pair of arms pivotally connected intermediate of their ends, a pair of links pivotally connected together at one end and articulated respectively at their other ends to the ends of said arms on one side of the pivotal connection of said arms, a cable connection between the common ends of said links and said piston, a half nut on each of the other ends of said arms, a rotatable threaded spindle adapted to be engaged by said half nuts and to displace the half nuts, arms and links in the direction for release of the brakes, and spring means tending to displace said half nuts away from the spindle.

8. Brake mechanism for vehicles comprising brakes on a vehicle, at least one servo cylinder on said vehicle, a servo piston within said cylinder and connected to said brakes, pumping means adapted to be connected to said cylinder to move the piston in the brake releasing direction, means for storing up energy on movement of the piston in the brake releasing direction and for giving up said energy on disconnection of the pumping means from the cylinder to force the piston in the opposite direction to apply the brakes, a pair of arms pivotally connected intermediate of their ends, a pair of links pivotally connected together at one end and articulated respectively at their other ends to the ends of said arms on one side of the pivotal connection of said arms, a cable connection between the common ends of said links and said piston, a half nut on each of the other ends of said arms, a rotatable threaded spindle adapted to be engaged by said half nuts and to displace the half nuts, arms and links in the direction for release of the brakes, spring means tending to displace said half nuts away from the spindle, and a stop for limiting the movement of said half nuts in the direction for release of the brakes.

9. Brake mechanism for vehicles comprising brakes on a vehicle, at least one servo cylinder on said vehicle, a servo piston within said cylinder and connected to said brakes, pumping means adapted to be connected to said cylinder to move the piston in the brake releasing direction, means for storing up energy on movement of the piston in the brake releasing direction and for giving up said energy on disconnection of the pumping means from the cylinder to force the piston in the opposite direction to apply the brakes, a pair of arms pivotally connected intermediate of their ends, a pair of links pivotally connected together at one end and articulated respectively at their other ends to the ends of said arms on one side of the pivotal connection of said arms, a cable connection between the common ends of said links and said piston, a half nut on each of the other ends of said arms, a self-locking thread formed on said half nuts, a rotatable spindle adapted to be engaged by said half nuts and to displace the half nuts, arms and links in the direction for release of the brakes, a self locking thread formed on said spindle, and spring means tending to displace said half nuts away from the spindle.

10. Brake mechanism for vehicles comprising brakes on a vehicle, at least one servo cylinder on said vehicle, a servo piston within said cylinder and connected to said brakes, pumping means adapted to be connected to said cylinder to move the piston in the brake releasing direction, means for storing up energy on movement of the piston in the brake releasing direction and for giving up said energy on disconnection of the pumping means from the cylinder to force the piston in the opposite direction to apply the brakes, a pair of arms pivotally connected intermediate of their ends, a pair of links pivotally connected together at one end and articulated respectively at their other ends to the ends of said arms on one side of the pivotal connection of said arms, a cable connection between the common ends of said links and said piston, a half nut on each of the other ends of said arms, a rotatable threaded spindle adapted to be engaged by said half nuts and to displace the half nuts, arms and links in the direction for release of the brakes, and spring means tending to displace said half nuts away from the spindle, the strength of said spring means being insufficient to force the half nuts apart when a force due to the resistance of said storing means is transmitted through the cable connection to the ends of said links.

11. Brake mechanism for vehicles comprising brakes on a vehicle, at least one servo cylinder on said vehicle, a servo piston within said cylinder and connected to said brakes, pumping means adapted to be connected to said cylinder to move the piston in the brake releasing direction, means for storing up energy on movement of the piston in the brake releasing direction and for giving up said energy on disconnection of the pumping means from the cylinder to force the piston in the opposite direction to apply the brakes, a pair of arms pivotally connected intermediate of their ends, a pair of links pivotally connected together at one end and articulated respectively at their other ends to the ends of said arms on one side of the pivotal connection of said arms, a cable connection between the common ends of said links and said piston, a half nut on each of the other ends of said arms, a rotatable threaded spindle adapted to be engaged by said half nuts and to displace the half nuts, arms and links in the direction for release of the brakes, handles on said half nuts for moving the nuts into engagement with the threaded spindle, and spring means tending to displace said half nuts away from the spindle, the strength of said spring means being insufficient to force the half nuts apart when a force due to the resistance of said storing means is transmitted through the cable connection to the ends of said links.

12. Brake mechanism for tractor and trailer vehicles comprising brakes on a tractor and on a trailer, servo-mechanism on said tractor and on said trailer for applying said brakes, common control means for said servo mechanisms, auxiliary brakes on the tractor, manual means for applying said auxiliary brakes, and a resilient connection between said manual means and the servo mechanism of the trailer vehicle for causing application of the trailer brakes on application of said auxiliary brakes of the tractor, said resilient connection allowing the common control means for said servo mechanisms to be operated without operating thereby the tractor auxiliary brakes.

13. Brake operating mechanism for tractor and trailer vehicles comprising servo mechanism on a tractor and on a trailer for applying the brakes thereof, pumping means, a brake pipe connecting said pumping means with the tractor servo mechanism, a trailer brake pipe extending from the tractor brake pipe to the trailer servo mechanism, an air vessel inserted in the trailer brake pipe, and a throttling element in said trailer brake pipe line intermediate of said air vessel and the tractor brake pipe for restricting the passage of atmospheric air into the tractor brake pipe on uncoupling of the trailer from the tractor.

In testimony whereof we have hereunto affixed our signatures.

AUGUST KAZENMAIER.
ALFONS STRAUSS.